United States Patent Office 2,909,512
Patented Oct. 20, 1959

2,909,512

ETHYLENE POLYMERIZATION USING A SOLID CATALYST

John MacMillan Bruce, Jr., Claymont, Del., assignor to E. I. du Pont de Nemours and Company, Wilmington, Del., a corporation of Delaware No Drawing. Application March 25, 1955
Serial No. 496,939

14 Claims. (Cl. 260—94.9)

This invention relates to a novel process for the polymerization of ethylene to solid polymers and more particularly to solid catalysts used in the process of polymerizing ethylene.

The use of solid catalysts and catalysts distributed on solid supports is well established in the field of polymer chemistry. Hydrogenation catalysts such as metals and metal oxides of iron, cobalt, nickel, copper, manganese, palladium, and others when used in conjunction with organo-alkali metal compounds or alkali metal hydrides have been successfully used with or without a support to polymerize ethylene to solid, wax-like brittle polymers as described in U.S. Patent 2,212,155. This patent discloses that in the absence of the hydrogenation catalyst the polymerization rate is only a small fraction of the polymerization rate observed in the presence of the hydrogenation catalyst; using the hydrogenation catalyst alone only tarry products are obtained.

More recently, in U.S. 2,692,257 and 2,692,258, solid catalysts for the polymerization of ethylene to high molecular weight, solid tough polymers have been disclosed. These catalysts comprise reduced molybdenum oxides and a catalytic support such as titania, zirconia or alumina. The reduction of the molybdenum oxide is achieved by reaction with a reducing agent such as hydrogen, carbon monoxide and sulfur dioxide. These patents further disclose that molybdenum alone whether in the reduced or unreduced state is not catalytically active and that also the metal oxide such as the titania is not catalytically active when used by itself. Thus heretofore it was believed that neither titania nor a hydrogenation catalyst nor an alkali metal reducing agent could cause the polymerization of ethylene in any substantial manner.

It is an object of this invention to provide further improvements in the polymerization of ethylene to high molecular weight solid polymers. A further object is to polymerize ethylene to solid polymers at moderate temperatures and pressures. Yet another object of this invention is a process for polymerizing ethylene to high molecular weight polymers using a solid catalyst which was not heretofore known to be effective for this purpose. Other objects will become apparent hereinafter.

The present invention is based on the discovery that the unique effectiveness of titania, alumina and zirconia in ethylene polymerization processes is not limited to activating or supporting a metal oxide type of catalyst but is exhibited even in polymerization systems wherein an ethylene polymerization catalyst is brought together with the titania, alumina or zirconia in an inert liquid hydrocarbon medium, i.e. the titania, alumina, or zirconia does not have to be introduced into the system in the form of a component of a supported catalyst. It has been discovered that ethylene can be polymerized in the presence of titania, alumina or zirconia as hereinafter described and an ethylene polymerization catalyst, such as a compound having at least one hydrocarbon group attached directly to a metal atom, or a catalyst formed by admixing an ionic compound of titanium, zirconium or vanadium with a compound of the formula alkali metal-M-(hydrocarbon)$_4$ or alkali metal-M-(H)$_4$, M being boron or aluminum, or in fact any metal alkyl, Grignard component or metal hydride.

This catalytic activity of the titania, alumina, and zirconia is extremely surprising, since titania along with alumina and zirconia has been known for its inertness and has found wide use as a catalyst support.

The exact nature of the mechanism of the catalysis involved in this invention is not known. It is however believed that in the case of titania, the catalytically active sites are formed on the titania as a result of a reaction with one of the catalyst components such as the metal alkyl, Grignard reagent, or metal hydride with the titania. It had been found that the titania may be reacted with one of the compounds of the class listed above, then separated from the reaction media containing an excess of the coreactant and used as such in the polymerization of ethylene.

The number of catalytically active sites formed on the surface of the titania depends to a great extent on the nature of the titania used in the reaction with the activator such as a metal alkyl. It was found that titanium dioxide having a high surface area, i.e. titania gel, gives higher polymerization rates than refractory or crystalline forms of titanium oxide. Apparently the catalyst can react to a significant degree with the titania only when a large surface of titania is available. The titanium oxides useful in the present invention may be prepared by known techniques. Generally pure titanium oxides are prepared by hydrolysis of titanium halides preferably titanium tetrachloride, with a base in an aqueous medium. This results in the formation of the water insoluble titanium hydroxide gel, which on washing and drying can be transformed into the desired titanium oxide by heating at elevated temperatures of 350 to 600° C. Other methods, such as using titanates to prepare high surface titanium oxides will be apparent to those skilled in the art. Although it is preferred to use pure titanium tetrachloride, minor impurities will not destroy the catalytic activity of the titania.

The activation of the titanium oxide may be carried out prior to the polymerization in a separate step or in the presence of the monomer. This reaction proceeds smoothly in the presence of an inert liquid hydrocarbon medium having the activating compound dissolved therein and which is in contact with the titanium dioxide. Preferably the reaction is carried out under a blanket of nitrogen to avoid the presence of oxygen and moisture which act as catalyst poisons. The reaction temperature may be varied from room temperature to any desired elevated temperature. The activation of the titania surface is characterized by the formation of a dark surface on the white titanium oxide. After reaction with the surface the excess catalyst, such as a metal alkyl, does not seem to serve any additional function and the remaining solution may be removed if so desired. Generally, however, it is advisable to carry out this reaction in the polymerization medium and in the presence of the monomer, which will also avoid any sources of contamination of the catalyst.

As stated hereinabove catalytic agents useful in forming the catalytically active titanium oxide surface are organometallic compounds and metal hydrides. The organometallic compounds useful in the process of this invention are lithium aluminum alkyls, alkenyls, cycloalkenylalkyls, etc., such as lithium aluminum tetraethyl cyclohexenyl and lithium alkyls such as lithium butyl among others. Grignard reagents, such as phenylmagnesium bromide, may also be mentioned. A useful metal hydride is lithium hydride or lithium aluminum hydride.

Although the catalytic agents of this invention may be classified as reducing agents, not all reducing agents such as hydrogen and carbon monoxide are useful in the present invention.

The titania of this invention may be employed in powder form or in the form of pellets. The powder form has the advantage of being more active as a catalyst. Titanium dioxide when used in the pellet form can be separated from the polymer with greater ease than when used in the powder form. The polymer which is formed on the surface of the catalyst is in general removed by solution in a hydrocarbon solvent at elevated temperatures. In using the powder form great care has to be taken not to include any small particles of the titania in the polymer if the polymer is not completely dissolved and if it is desired to avoid titania in the product.

If zirconia or alumina is employed instead of titania, these compounds should also be in a form such that they are capable of absorbing gases, i.e., they should have a high surface area.

The polymerization of ethylene according to the process of this invention takes place most satisfactorily when the polymerization mixture is substantially moisture free and also free of other sources of hydroxyl groups. As in numerous other ethylene polymerization processes, the reaction mixture should be kept free of oxygen or preferably the oxygen content should be below 200 parts per million.

In general, polymerization can be effected in the present process at temperatures of 0° to 250° C., preferably between 100° to 200° C. Pressures should be high enough to maintain the medium in the liquid phase. At relatively high temperatures low molecular weight polymer is produced, whereas at lower temperatures the rate of polymerization becomes significantly slower. The pressures used in the present process can be varied from atmospheric pressure to very high pressures of 1000 atmospheres and more. However, it is preferred to employ moderately high pressures suitably from 10 to 200 atmospheres or higher in order to facilitate the handling of ethylene and avoid the use of costly high pressure equipment.

The process of this invention is well suited for batch operation as well as continuous operation. Upon purification spent catalyst may be reactivated in a manner similar to the original activation of the titanium oxide. The polymerization of ethylene although possible in the gas phase is preferably carried out in a liquid reaction medium which can dissolve the monomer and thus provide a better contact between the catalyst and the monomer resulting in higher polymerization rates and yields. Liquid reaction media useful in this process are saturated hydrocarbons such as cyclohexane, n-decane and higher boiling aliphatic or cycloaliphatic hydrocarbons and also aromatic and partially saturated aromatic hydrocarbons such as benzene, toluene, tetrahydronaphthalene and the like. The quantity of solvent used may be varied over a wide range and often depends on the type of process employed in the polymerization using the novel catalysts of this invention. Thus it is desirable to use large quantities of the reaction medium when using a continuous process in which the polymer after having been polymerized on the catalyst is dissolved in the reaction medium. To keep the polymer in solution the concentration of the polymer is kept at a low level such as 10 to 15% by weight of the solvent. In batch operations the quantity of solvent may be reduced and the polymer formed on the catalyst dissolved in a separate operation. The dissolved polymer is conveniently precipitated from the solution by such methods as cooling or addition of a nonsolvent such as acetone or methyl alcohol.

The process of this invention is not only useful in the manufacture of ethylene homopolymers but is also effective in the polymerization of other terminally unsaturated olefins and in the manufacture of such copolymers as ethylene-propylene, ethylene-butadiene, and other copolymers in which the comonomer is a hydrocarbon compound containing an ethylenic bond. Many of these copolymers have properties which differ widely from copolymers of the prior art containing the same components.

The invention is further illustrated by the following examples.

*Example 1.*—To 100 ml. of a mixture of ice and water was added 104 ml. (1 mol) of titanium tetrachloride under continuous agitation. The hydrochloric acid formed was removed by application of a vacuum to the reaction mixture. To this resulting solution was added an additional 100 ml. of distilled water and a concentrated solution of ammonia was then added under agitation stepwise to the solution until a pH of 8 to 9 was attained. As a result of the addition the titania gel precipitated out of the aqueous phase and was thoroughly washed with water until free of chloride ions. The filtered product was dried in vacuo for a period of 12 hours at a temperature of 90° C. The resulting material was crushed and then calcined for 3 hours at a temperature of 450–520° C. in a slow stream of air, and then repulverized. To 2 g. of the titania thus prepared was added approximately 50 ml. of toluene and a solution of 0.01 mol of lithium aluminum tetra (ethyl cyclohexenyl) in 50 ml. of toluene under a blanket of nitrogen. The color of the titania turned a very dark grey. This reaction mixture was placed in a pressure reaction vessel having a capacity of 330 ml. under a blanket of nitrogen. The reaction vessel was flushed with ethylene, heated to 100° C. and pressured to 1000 p.s.i. ethylene for a period of 2 hours under continuous agitation. The temperature was then increased to 200° C. for an additional 2 hours at a pressure of 1100 p.s.i. After a total of 4 hours the polymerization was stopped, the reaction mixture cooled down to room temperature and excess monomer vented off. The catalyst and the polymer was filtered from the reaction medium and the polymer was separated from the catalyst by boiling in tetrahydronaphthalene which dissolved the polymer. Upon precipitation and washing and drying 1.5 g. of a solid white polymer was obtained having a density of about 0.96. The polymer could be compression molded into tough, flexible films by pressing at 200° C. under 20,000 p.s.i. for a period of 2 minutes. Investigation of the polymer structure by infrared showed less than 0.2 methyl groups per 100 carbon atoms.

*Example 2.*—Example 1 was repeated using 5 g. of the calcined titanium oxide, the preparation of which is described in Example 1, and 0.01 mole of lithium aluminum tetra(ethyl cyclohexenyl). The polymerization was carried out at 150° C. for a period of 3 hours, at an ethylene pressure of 1000 p.s.i. A solid polymer weighing 9 grams was obtained on precipitation from the solution. The polymer was found to have a density of about 0.95 and could furthermore be compression molded into tough flexible films by the procedure described in Example 1.

*Example 3.*—Into a pressure vessel having a capacity of approximately 330 ml. was charged under a blanket of nitrogen 5 grams of titanium oxide (commercial grade, Baker and Adamson), 100 ml. of benzene and 1 gram of lithium aluminum hydride. The reaction vessel was flushed with ethylene, heated to 150° C., and pressured to 1000 p.s.i. of ethylene. Maintaining temperature and pressure the vessel was agitated for a period of two hours. Upon washing, filtering, and drying the resulting polymer catalyst mixture, the polymer was separated from the catalyst by solution in boiling tetrahydronaphthalene. Upon precipitation 0.2 gram of a white solid polymer was obtained having a density of about 0.96. Infrared analysis indicated less than 0.2 methyls per 100 carbon atoms. The polymer could be molded into tough flexible films.

*Example 4.*—Using the procedure described in Example 1, 0.02 mole of butyl lithium was added to 5 g.

of titanium dioxide in 100 ml. of benzene in the polymerization of ethylene. Upon separation from the catalyst 3 g. of a solid white polymer was obtained. The polymer could be molded into tough, flexible films and was similar to the polymers described in previous examples. A similar result is obtained by use, in place of titanium dioxide, of zirconia similarly prepared from zirconium tetrachloride.

Example 5.—Following the procedure described in Example 3, ethylene was polymerized using 0.03 mol of phenyl magnesium bromide as an activator for 5 grams of $TiO_2$ prepared as described in Example 1. One gram of a solid white polymer was obtained. The polymer was found to have a density of about 0.96 and could be molded into tough films by compression molding as described hereinabove.

Example 6.—A mixture composed of 250 ml. toluene, 15 grams "activated alumina" (200 mesh), 12.0 grams $TiCl_4$, and 6.0 grams $NaBH_4$ was heated at refluxing temperature under atmospheric pressure, and ethylene was bubbled through at the rate of 300 cc. per minute, for 1.5 hours. After this the temperature was lowered to 90°, and the heating was continued for 5 hours. A sample was withdrawn and filtered, and the filtrate was observed on cooling to contain solid polyethylene. The experiment was repeated without however using any alumina. Cooling of the filtrate produced no polyethylene.

Example 7.—A mixture composed of 1000 ml. cyclohexane, 0.29 gram lithium aluminum tetradecyl, 0.09 gram titanium tetrachloride (vanadium trichloride or zirconium tetrachloride can be used in place of the titanium tetrachloride) and 0.1 gram of titania (which had been vacuum-dried for 16 hours at 80° C.) was heated at 50° C. under atmospheric pressure. Ethylene was introduced, which caused precipitation of polymer (11 grams in 1 hour). The polymer was separated by filtration and was obtained in the form of a clean white powder.

It is to be understood that the procedures of Examples 6 and 7 can be used with other alkali metal aluminum (or boron) tetraalkyls or tetrahydrides.

In general, the polymers obtained by the present invention are solid polymers exclusively and are not contaminated with Friedel-Crafts type of low molecular weight brittle or oily polymers. The structure of the polyethylene made in accordance with the present process is characterized by being a straight chain hydrocarbon with some vinyl groups therein. The infrared measurements indicated very little methyl substitution and a very small number of vinylidene groups with little or no trans-unsaturation as compared to solid polymers of ethylene prepared by free radical polymerization. In addition the polymers prepared by the process of the present invention are generally of a higher density, 0.93 to 0.98, than polymers prepared by free radical polymerization processes.

The quantity of the solid catalyst used may be varied over a wide range and optimum quantities are dependent on process conditions such as the reaction temperature and the ethylene pressure employed and are in addition determined by the type of process used. Thus in a continuous process it may be desirable to employ large quantities of the catalyst as compared to the monomer or polymer to make removal of the polymer from the catalytic surface of the titanium dioxide during polymerization possible. In general it may be said that the principles as applied heretofore to polymerization on solid catalysts apply to the present invention. The molar ratio of the activator to the titanium dioxide should be no smaller than one tenth. Ratios exceeding one do not increase the activity of the catalyst to any significant extent.

The ethylene polymers obtained in accordance with the process of this invention are highly valuable in numerous applications especially in the form of films, molded articles, extruded insulation on wire, fibers and others.

I claim:

1. The process of polymerizing ethylene at a temperature of 0 to 250° C. to a solid polymer which comprises introducing ethylene into a reaction system, said system consisting essentially of the mixture formed by bringing together, in an inert hydrocarbon medium, an ethylene polymerization catalyst and a calcined metal oxide having a high surface area, said metal oxide being at least one member of the class consisting of alumina, titania and zirconia said ethylene polymerization catalyst being of the class consisting of (1) organometallic compounds having at least one hydrocarbon group attached directly to metal, and, (2) combinations of a transition metal halide of the class consisting of titanium, vanadium and zirconium halides and metal-R compounds, wherein R is a member of the class consisting of hydrogen and hydrocarbon radicals, there being present no other essential ethylene polymerization catalyst component.

2. Process of claim 1 wherein said ethylene polymerization catalyst comprises a compound having a metal atom attached directly to at least one alkyl group.

3. Process of claim 1 wherein said ethylene polymerization catalyst is formed by admixing a metal alkyl with a halide of a transition metal of the class consisting of titanium, zirconium and vanadium.

4. Process of claim 1 wherein said ethylene polymerization catalyst is formed in situ by admixing a titanium halide with an alkali metal -M-(hydrocarbon)$_4$ compound, wherein M is a metal of the class consisting of boron and aluminum.

5. Process of claim 1 wherein the said ethylene polymerization catalyst is formed in situ by admixing a titanium halide with an alkali metal -M-(H)$_4$ compound wherein M is a metal of the class consisting of boron and aluminum.

6. Process of claim 1 wherein said ethylene polymerization catalyst comprises a compound of aluminum in which valence bonds of the aluminum are satisfied by hydrocarbon groups.

7. Process of claim 1 wherein the temperature is 70° to 200° C., and the pressure is sufficient to maintain the said medium in the liquid phase.

8. Process of claim 7, performed at atmospheric pressure.

9. The process of claim 1 wherein the polymerization catalyst is a metal alkyl.

10. The process of claim 1 wherein the polymerization catalyst is a lithium aluminum alkyl.

11. The process of claim 1 wherein the polymerization catalyst is a lithium alkyl.

12. The process of claim 1 wherein the polymerization catalyst is formed in situ by admixing a titanium halide with a lithium aluminum tetraalkyl.

13. The process of claim 1 wherein the polymerization catalyst is formed in situ by admixing a titanium tetrachloride with lithium aluminum tetraalkyl.

14. The process of claim 1 wherein the polymerization catalyst is formed in situ by admixing a titanium tetrachloride with sodium boron hydride.

References Cited in the file of this patent

UNITED STATES PATENTS

| | | |
|---|---|---|
| 2,377,779 | Hanford | June 5, 1945 |
| 2,475,520 | Roedel | July 5, 1949 |
| 2,691,647 | Field et al. | Oct. 12, 1954 |
| 2,699,457 | Ziegler | Jan. 11, 1955 |
| 2,721,189 | Anderson et al. | Oct. 18, 1955 |
| 2,829,136 | Fotis et al. | Apr. 1, 1958 |

FOREIGN PATENTS

| | | |
|---|---|---|
| 534,792 | Belgium | May 2, 1955 |
| 534,888 | Belgium | May 2, 1955 |